United States Patent
Kobayashi

[11] Patent Number: 6,157,155
[45] Date of Patent: Dec. 5, 2000

[54] ROBOT PATH PLANNING METHOD WHERE BENDING OWING TO LOAD IS TAKEN INTO CONSIDERATION

[75] Inventor: Hirohiko Kobayashi, Fujiyoshida, Japan

[73] Assignee: Fanuc Ltd., Yamanashi, Japan

[21] Appl. No.: 08/402,606

[22] Filed: Mar. 13, 1995

[30] Foreign Application Priority Data

Mar. 16, 1994 [JP] Japan .................................. 6-072747

[51] Int. Cl.[7] .................................................. G05B 19/408
[52] U.S. Cl. .............................. 318/568.22; 318/568.2; 318/646; 318/573; 318/568.1; 901/3; 901/9; 901/15
[58] Field of Search ........................... 318/568.2, 568.22, 318/646, 571, 634, 578, 570, 572, 573, 568.1; 364/474.35, 474.03, 474.28, 474.14, 474.09, 474.36; 395/80, 85, 87, 91, 95, 96; 901/3, 9, 15

[56] References Cited

U.S. PATENT DOCUMENTS

| | | | |
|---|---|---|---|
| 3,679,955 | 7/1972 | Rhoades | 318/572 |
| 4,132,937 | 1/1979 | Engelberger et al. | 318/568 |
| 4,542,471 | 9/1985 | Inaba et al. | 318/634 |
| 4,819,184 | 4/1989 | Jönsson et al. | 369/513 |
| 4,967,127 | 10/1990 | Ishiguro et al. | 318/571 |
| 5,003,237 | 3/1991 | Kimura | 318/572 |
| 5,418,441 | 5/1995 | Furukawa | 318/568.22 |
| 5,426,722 | 6/1995 | Batchelder | 395/80 |

Primary Examiner—Robert E. Nappl
Assistant Examiner—Edgardo San Martin
Attorney, Agent, or Firm—Staas & Halsey LLP

[57] ABSTRACT

The present invention relates to a robot path planning method for determining the path of a robot, taking into consideration the bending effect of the robot path when heavy tools are load onto the robot. Specifically, straight line P'-Q' to be actually drawn by the distal end of the robot tool is calculated by using the positions P and Q of the distal end of the tool at the start point and at the end point of the straight line recognized by the robot controller. And, the interpolation points H1', H2', H3', . . . are set on this line P'-Q'. Then, the bending amount $\Delta\theta pj$ and $\Delta\theta qj$ at the start point P' and at the end point Q' of this line P'-Q' are respectively determined. And, the bending amount at each interpolation point H1', H2', . . . are calculated from these bending amounts $\Delta\theta pj$ and $\Delta\theta qj$, and the position on the line P'-Q' of each interpolation point. Then, the values obtained by subtracting from each interpolation point H1', H2', . . . corresponding bending amounts are set as the interpolation points H1, H2, H3, . . . to be actually used in the robot controller.

5 Claims, 3 Drawing Sheets

ROBOT PATH PLANNING METHOD WHERE BENDING OWING TO LOAD IS TAKEN INTO CONSIDERATION

BACKGROUND OF THE INVENTION

1. Field of the Invention

The present invention relates to a control technique of an industrial robot (hereinafter simply referred to as "robot"), more particularly, relates to a robot path planning method for determining the path of a robot, taking into consideration the bending caused by the load imposed on the robot when the robot is being controlled.

2. Description of the Related Art

In general, a load is imposed on a robot, and particularly when a heavy tool such as a welding torch is mounted, the bending of each axis of the robot owing to the load becomes too great to be neglected. With regard to bending amount which exists under the condition where calibration of the origin position of each axis of a robot (i.e., mastering) is performed (in other words, under the load condition in accordance with robot attitude or the like), it is possible, by performing mastering, to make a robot controller to take recognition of a position and an attitude of distal end of a tool (hereinafter simply referred to as "robot position") into which such bending amount is incorporated. However, since the load imposed on each axis differs depending upon a posture of the robot and a weight and shapes of the tool to be mounted, when the robot is on a general robot path, there is a discrepancy between the robot position which is recognized by the robot controller and the actual robot position. In addition, the current position data displayed on the display attached to the robot controller may no longer be accurate.

Therefore, when the robot which makes path plans at the time of programming fails to take in account of the bending caused by different loads is activated, the actual path of the robot may deviate from the desired path, even if the robot path data in the robot controller agrees with the desired path.

As of now, any robot path planning method which realizes the desired path of the robot by taking account of bending owing to the load is not known.

OBJECTS AND SUMMARY OF THE INVENTION

The object of the present invention is to provide a robot path planning method in which a bending amount of the robot owing to a load is calculated with a predetermined algorithm, and a robot movement path is corrected by using the calculation result to obtain the desired path which robot actually draws. More specifically, the object of the present invention is to provide a robot path planning method which can calculate an appropriate robot path without imposing an excessive process on the robot controller.

The present invention is directed to implementing a desired robot path (a robot path which actually agrees with the position data) by providing the position data and the robot load parameter to the robot controller, thereby performing a path planning program where effect of bending owing to the load is taken into consideration. Namely, in the robot controller, a robot path which agrees with the position data is not required, but a position where a shift amount for compensating the discrepancy corresponding to the bending is added to the position data is required successively as a target point for the movement. If the robot is moved in a manner such that it follows this target points in order, the actual positions of the robot constitute a path which agrees substantially with the position data.

First, with respect to the section to be moved, each axial data of the position of the start point is read, and the bending amount of each axis is determined based on each axial data relating to the position of the start point and the load parameter of the robot (with regard to hand tools, data relating to the ones which have been mounted at that time).

Next, the actual value of each axis is calculated by adding the determined bending amount of each axis to each axial value regarding the position of the start point.

Similarly, each axial data relating to the position corresponding to the position of the end point is read, and the bending amount of each axis is determined based on each axial data regarding the position of the end point and the load parameter of the robot. And, the bending amount of each axis is added to each axial value relating to the position of the end point to calculate each axial value which takes account of the shift owing to the bending. Furthermore, the bending volume of each axis is calculated based on each axial value and the load parameter of the robot.

Then, from each axial value where shift owing to the bending is taken into consideration, the coordinate values of the corresponding position of the start point and the position of the end point of the robot are determined, and the position of each interpolation point on a linear line which links the points given by both coordinate values is determined. Furthermore, the bending volume of each axis regarding the position of each interpolation point is calculated by using the bending amounts at the start point and the end point as determined before. And, each axial value corresponding to the position of the interpolation point is calculated, and each axial value of the interpolation point is calculated by subtracting the bending amount at each interpolation point determined above from each axial value.

If the robot is controlled to move in a manner such that a target movement point of the robot is in accord with the determined robot position each time, the robot path to be realized become a desired path where effect of bending is taken into consideration (that is, a robot path as is indicated by position data).

DETAILED DESCRIPTION OF THE PREFERRED EMBODIMENTS

Figure 1:
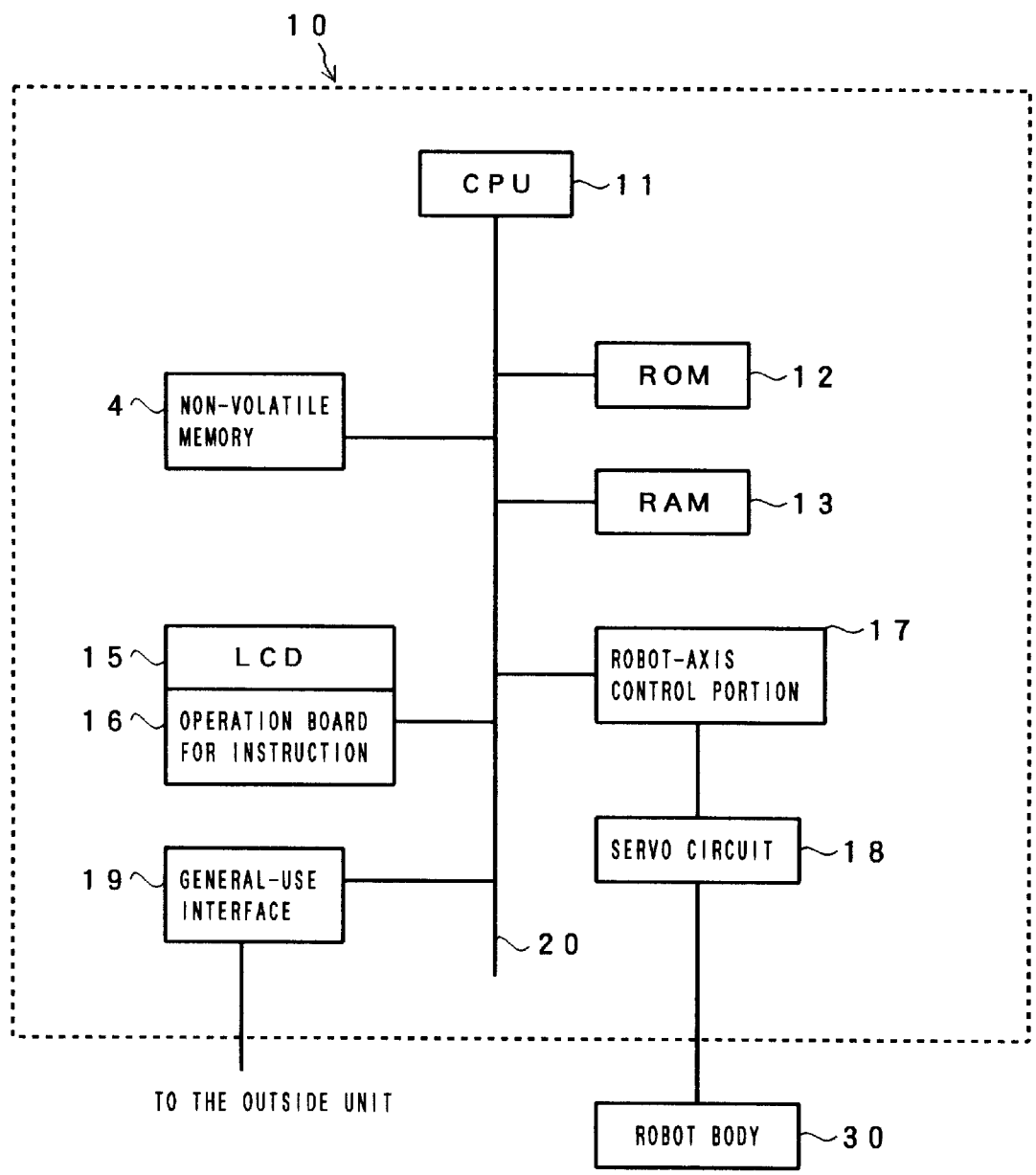
FIG. 1 is a block diagram showing the main part of one embodiment of the robot controller used in the implementation of the present invention in a diagrammatic structure.

FIG. 1 is a block diagram showing the main part of one embodiment of the robot controller used in the implementation of the present invention in a diagrammatic structure.

In the drawing, the robot controller designated by reference numeral 10 has a central processing unit (hereinafter referred to as "CPU") 11, to said CPU 11 are connected a memory 12 composed of ROM, a memory 13 composed of RAM, a non-volatile memory 14 composed of CMOS element and the like, an operation board for instruction 16 having LCD (liquid crystal display) 15, a robot axis-controlling portion 17 for controlling each axis of the robot, and a general-use signal interface 19 via a bus 20. The robot axis-controlling portion 17 is further connected to a robot body 30 via a servo circuit 18, and outside units such as an off-line programming unit and the like are properly connected to the general-use interface 19.

In ROM memory 12, a program for controlling the whole robot controlling unit is stored, and in the non-volatile memory 14, there are stored a motion program of the robot and related data, definition data of each coordinate system and the like.

Such a structure and functions are not basically different from those of the conventional robot controller, however, in the robot controller of the present embodiment, a program and related required data including a path planning process described below (the arm length, the arm weight data, the data of the hands and tools which are planned to be mounted (such as the balance position data, the weight data and the like), required for the calculation of the bending amount at the instruction point) are further stored in the non-volatile memory 14. Incidentally, these data are hereinafter referred to as "load parameter of the robot" collectively.

The method to determine the adequate path by taking account of the bending owing to the load into the robot path planning will now be described by way of an example shown in FIG. 2, and the content of the process of the path planning program in line with said method will be described with reference to the flow chart of FIG. 3.

Figure 2A:
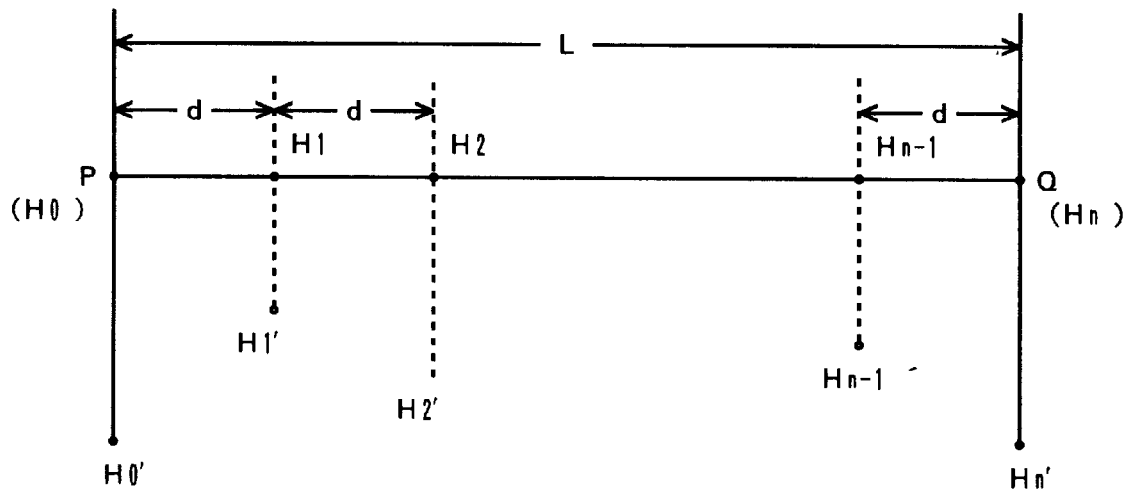
FIG. 2A is a view illustrating the discrepancy between the position of the robot recognized by the robot controller and the actual position of the robot, in the case where the robot moves linearly in one section between instruction points P and Q.
Figure 3:
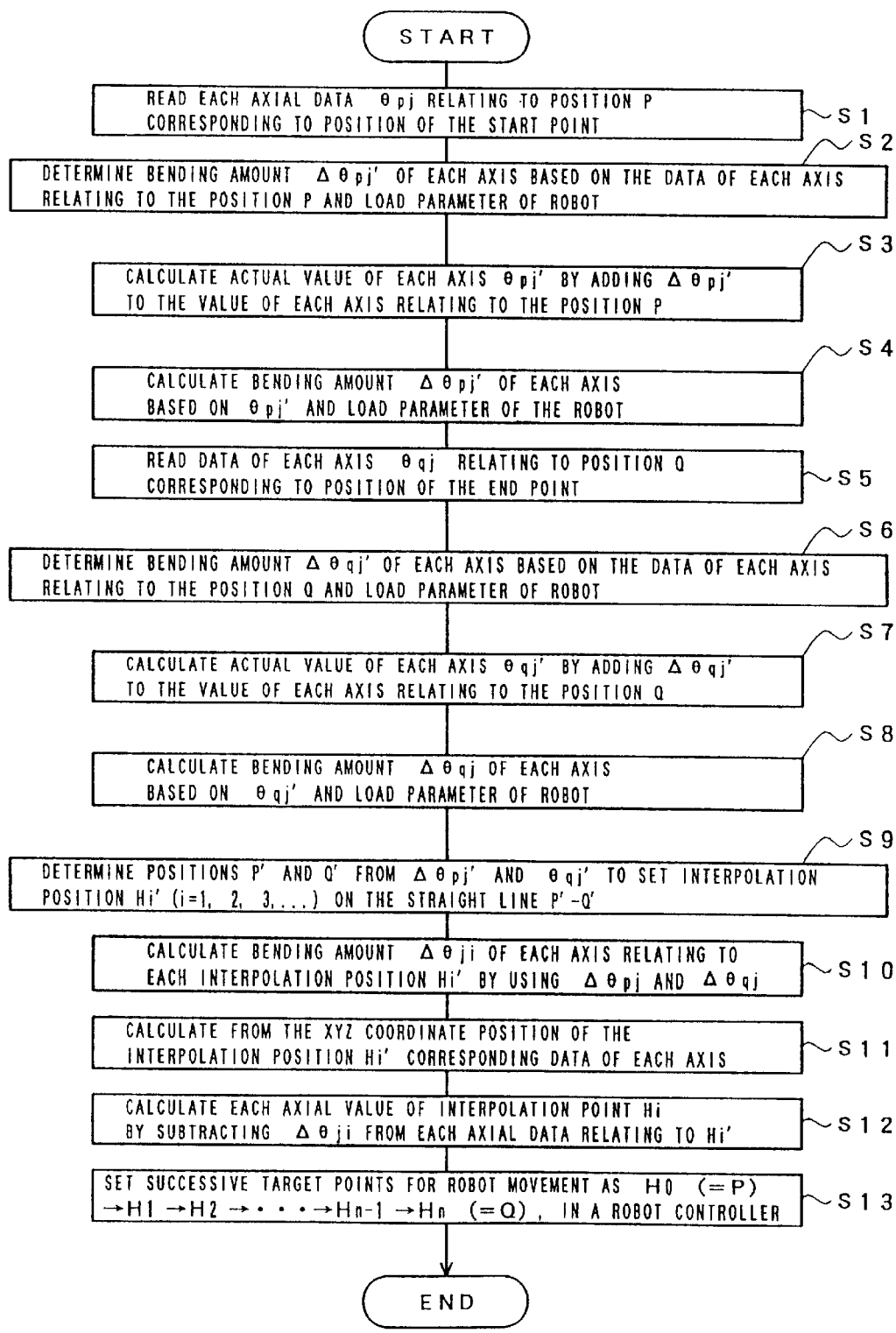
FIG. 3 is a flow chart describing the summary of the procedure of the process to implement the robot path planning method according to the present invention with respect to the example shown in FIG. 2.

FIG. 2A is a view illustrating the discrepancy between the position of the robot recognized by the robot controller and the actual position of the robot taking account of the shift owing to the bending, in the case where the robot moves linearly in one section between instruction points P and Q. The reference numerals shown in the drawing represent as follows:

P: Position of the robot at the start point of the linear path recognized by the robot controller;

P': Actual position of the robot at the start point of the linear path;

Q: Position of the robot at the end point of the linear path recognized by the robot controller;

Q': Actual position of the robot at the end point of the linear path;

Hi: Position of the interpolation point of No. i calculated in the robot controller, wherein i=0, 1, 2, 3... n−1, n, and H0=P, Hn=Q;

Hi': Actual position of the robot corresponding to the interpolation point Hi, wherein H0'=P';

L: Distance between the points P and Q;

d: Distance between the interpolation points adjacent to each other, and L=nd is established here.

The actual robot path in the case where a robot path planning according to the present invention is not conducted is shown, by using the above symbols, as follows;

$$P'=H0'\to H1'\to H2'\to \ldots \to Hn-1'\to Hn'=Q'.$$

The present invention is directed to making a path plan so that the discrepancy between each position of the robot recognized by the robot controller and an actual position of the robot is compensated.

Figure 2B:
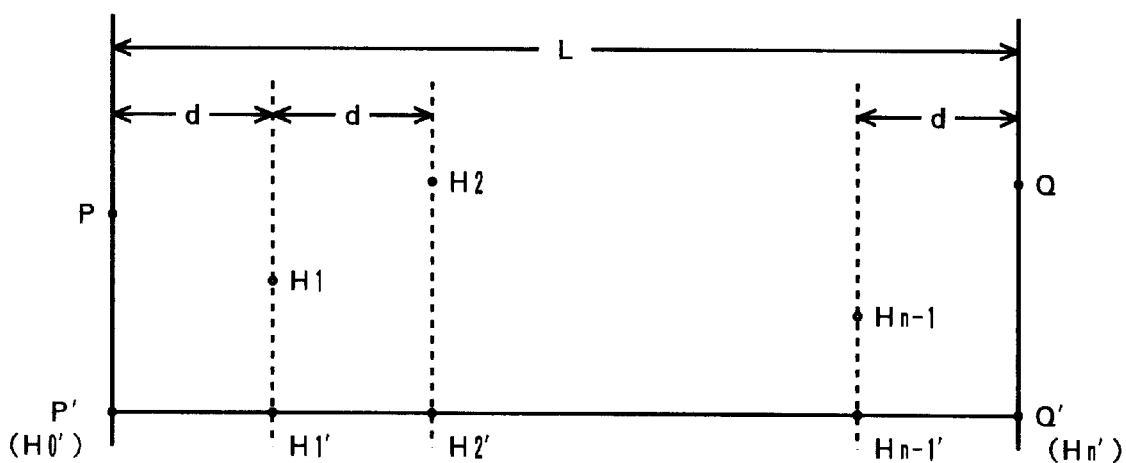
FIG. 2B is a view illustrating a method to make a plan for the path so that the actual robot path overlaps as much as possible the position of the linear path from P to Q in FIG. 2A.

Namely, as shown in FIG. 2B, it is desired to make the path planning based on the corrected value of the position data of P and Q so that the robot path actually realized, $P'=H0'\to H1'\to H2'\to \ldots \to Hn-1'\to Hn'=Q'$ may overlap the linear path $P\to Q$ in FIG. 2A as much as possible. Incidentally, each point H1, H2, ... Hn−1 in FIG. 2B represents illustratively a position of interpolation point corresponding to the data the robot controller uses for the interpolation calculation in making a path planning according to the present invention.

Therefore, in the present embodiment, with regard to the start point and the end point of the linear path, the bending amount of each axis $\theta j$ of the robot (if there are 6 axes, then j=1, 2, 3, 4, 5 and 6) is calculated for the start point P and the end point Q of the linear path, based on the load parameter of the robot preliminarily stored in the non-volatile memory 14 of the robot controller, based on which bending amount of each axis $\theta j$ at the intermediate interpolation point (interpolation point of No. 1–No. n−1) is calculated.

If the bending amounts of each axis $\theta j$ (the angular displacement of the articular angle due to the load) of each axis $\theta j$ in the start point P' and the end point Q' which are calculated based on the load parameter of the robot are assumed to be $\Delta\theta pj$ and $\Delta\theta qj$, the presumed bending amount $\Delta\theta ji$ of each axis at each intermediate interpolation point is given by the following equation [1] or [2]:

$$\Delta\theta ji = \Delta\theta pj + [(\Delta\theta qj - \Delta\theta pj) \times id/L] \quad [1]$$

$$\Delta\theta ji = \Delta\theta pj + [(\Delta\theta qj - \Delta\theta pj) \times t/T] \quad [2]$$

provided that T represents the time required for the robot to reach from the start point to the end point, and t represents the time required for the robot to reach from the start point to the interpolation point of No. i.

Now, in order to determine correctly the bending amount $\Delta\theta pj$ and $\Delta\theta qj$ of each axis $\theta j$ at the start point P' and the end point Q', the data of each axial value at the points P' and Q' become necessary, but they can be determined by utilizing the data relating to the positions P and Q which the robot controller 10 has.

The summary of the content of the process of the path planning program including the calculation process therefor will be described with reference to the flow chart of FIG. 3.

First, each axial data $\theta pj$ relating to the position P corresponding to the position of the start point is read (step S1), and the bending amount $\Delta\theta pj'$ of each axis is determined based on the data of each axis relating to the position P and the load parameter of the robot (with regard to the hands and tools, the data relating to the ones mounted at that time) (step S2).

Then, each axial value where shift owing to the bending is taken into consideration is calculated by adding the bending amount $\Delta\theta pj'$ of each axis $\theta j$ determined by step S2 to each axial value relating to the position P. This is assumed to be $\theta pj'$ (step S3). At step S4 to be followed, the bending amount $\Delta\theta pj$ of each axis is calculated based on each axial value $\theta j'$ calculated at step S3 and the load parameter of the robot.

Similarly, each axial data $\theta qj$ relating to the position Q corresponding to the position of the end point is read (step S5), and the bending amount $\Delta\theta qj'$ of each axis is determined based on each axial data relating to the position Q and the load parameter of the robot (step S6). Then, each axial value where shift owing to the bending is taken into consideration is calculated by adding the bending amount $\Delta\theta qj'$ of each axis determined by step S6 to each axial value relating to the position Q. This is assumed to be $\theta qj'$ (step S7). Furthermore, the bending amount $\Delta\theta qj$ of each axis is calculated based on each axial value $\theta qj'$ calculated at step S7 and the load parameter of the robot (step S8).

Then, at step S9, the coordinate value $(Xp', Yp', Zp')$ and $(Xq', Yq', Zq')$ of the corresponding positions P' and Q' of the robot are determined from each axial value $\theta pj'$ and $\theta qj'$ determined at steps S3 and S7. And, the position Hi' $(Xi', Yi', Zi')$ of each interpolation point on the linear line which connects the points given by both the coordinate values is determined.

Then, the bending amount $\Delta\theta ji$ of each axis relating to the position Hi' of each interpolation point is calculated from the above equation [1] or [2], by using $\Delta\theta pj$ and $\Delta\theta qj$ determined by steps S4 and S8 (step S10). Furthermore, corresponding data of each axis is calculated from the XYZ coordinate values $(Xi', Yi', Zi')$ of the position H1' of the interpolation point (step S11), and each axial value $\theta ji$ (if there are 6 axes, j=1, 2, 3, 4, 5 and 6) of the interpolation point Hi is calculated by subtracting each bending amount $\Delta\theta ji$ determined at step S10 from said each axial data (step S12).

The positions determined in this manner correspond to the position represented as P (=H0), H1, H2, ... Hn−1, Q (=Hn) in FIG. 2B.

If the robot is controlled by the robot controller 10 so that it may move in a manner such that a target movement point of the robot is in accord with each of the robot positions, H0 (=P)→H1→H2→ ... →Hn−1→Hn (=Q), successively, the robot path to be actually realized becomes a desired robot path where effect of bending is taken into consideration, H0'(=P')→H1'→H2' ... Hn−1'→Hn'(=Q').

The robot path planning method of the present invention has been described by means of an example of a linear movement between two points, but with regard to a path connecting multiple points, if the process described above is repeated, the robot path planning where bending is taken into consideration can also be made. Furthermore, it is needless to say that in case that an arc path is included, if the calculation method of the interpolation point is changed accordingly, the robot path planning where effect of bending is taken into consideration can be made without basically changing other calculation process.

According to the present invention, the robot path planning where effect of bending of the robot owing to the load is taken into consideration can be made without imposing excessive processing burden on the robot controller.

Therefore, if the robot is controlled to more in a manner such that it follows the robot path determined by the path planning method of the present invention, the robot path which is highly consistent with the scheduled, desired path is realized, and the accuracy of the robot operation can be improved.

What is claimed is:

1. A robot path planning method where bending owing to load is taken into consideration, comprising steps of:
    (a) calculating a linear section to be drawn by a distal end of a robotic tool, by using said distal end of said robotic tool at a starting point and at an ending point of said linear section as recognized by a robot controller;
    (b) setting a first plurality of interpolation points on said linear section as calculated in step (a);
    (c) determining a bending amount at said distal end of said robotic tool at said starting point and at said ending point, respectively, of said linear section;
    (d) calculating said bending amount at said distal end of said robotic tool at each said first plurality of interpolation points, based on said bending amount of said distal end of said robotic tool at said starting point and at said ending point of said linear section as determined in step (c), and set a position of each of said first plurality of interpolation points on said linear section; and
    (e) setting a second plurality of interpolation points to be used in said robot controller by subtracting said bending amount at said distal end of said robotic tool at each of said first plurality of interpolation points calculated in step (d), from each of said second plurality of interpolation points of step (e).

2. A robot path planning method using a robot controller, in which bending of a plurality of axes each having an axial value of a robot owing to load is taken into consideration, comprising steps of:
    (a) determining bending amount of each axis at a starting point and at an ending point, based on a position data of said starting point and a position data of said ending point and a load parameter of the robot, which bending amount is added to each axial value corresponding to said position data of said starting point and said position data of said ending point, to determine each axial value corresponding to a position of said starting point and a position of said ending point, in which bending is taken into consideration for at least one section to which said position data of said starting point and said position data of said ending point are given;
    (b) determining bending amount of each axis relating to said starting point and said ending point, based on said each axial value in which bending is taken into consideration and said load parameter of the robot;
    (c) determining a plurality of corresponding coordinate values of the position of said starting point and of the position of said ending point of the robot, based on each axial value in which bending is taken into consideration as determined in step (a); and determining positions of a plurality of interpolation points on the robot path connecting the starting and ending points given by the coordinate values,
    (d) determining said bending amount of each axis relating to said positions of each interpolation point based on said bending amount relating to said starting point and said ending point as determined in step (b); and
    (e) determining each coordinate value of each interpolation point as the data which represent target positions for a sequential movement, by calculating each axial value corresponding to an interpolation point based on said positions of said interpolation points, and subtracting said bending amount at each interpolation point as determined in step (d) from each of said calculated axial value.

3. The robot path planning method where bending owing to the load is taken into consideration according to claim 2, in which bending amount of each axis at each interpolation point on the robot path is given in a manner such as that in step (d), the bending amount of each axis relating to said starting point as determined in step (b) changes linearly according to a distance going away from said starting point on the robot path of step (c) to become the bending amount of each axis relating to the end point as determined by said step (b) at said ending point.

4. The robot path planning method where bending owing to the load is taken into consideration according to claim 2, in which bending amount of each axis at each interpolation point on said robot path is given in a manner such as that at said step (d), the bending amount of each axis relating to said starting point as determined in step (b) changes linearly according to a lapse of time which is required to move from said starting point toward said ending point on the robot path of step (c) to become the bending amount of each axis relating to said ending point as determined in step (b) at said ending point.

5. A method of compensating deviations of robot movement due to varying loads placed on a robot, comprising:

1) determining a first traveling path from a starting position to an ending position of a robot that has not been loaded with robotic tools;

2) determining a second traveling path from said starting position to said ending position of a robot that has been loaded with robotic tools;

3) determining amount of displacements between said first traveling path and said second traveling path;

4) determining an amount of angular adjustment to a plurality of axes of said robot that has been loaded with robotic tools so that it travels along said first traveling path.

* * * * *